United States Patent
Luo

(10) Patent No.: US 12,088,364 B2
(45) Date of Patent: Sep. 10, 2024

(54) WIRELESS COMMUNICATION APPARATUS, ANTENNA DETECTION METHOD AND USER DEVICE

(71) Applicant: XI'AN ZHONGXING NEW SOFTWARE CO., LTD., Xi'an (CN)

(72) Inventor: Yibao Luo, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 17/906,934

(22) PCT Filed: May 10, 2021

(86) PCT No.: PCT/CN2021/092636
§ 371 (c)(1),
(2) Date: Sep. 21, 2022

(87) PCT Pub. No.: WO2021/244226
PCT Pub. Date: Dec. 9, 2021

(65) Prior Publication Data
US 2023/0128757 A1     Apr. 27, 2023

(30) Foreign Application Priority Data
Jun. 3, 2020   (CN) .......................... 202010494637.6

(51) Int. Cl.
*H04L 23/02*      (2006.01)
*H04B 7/0426*   (2017.01)
(Continued)

(52) U.S. Cl.
CPC ......... *H04B 7/0426* (2013.01); *H04B 7/0608* (2013.01); *H04B 17/0085* (2013.01)

(58) Field of Classification Search
CPC ..... H04W 24/10; H04W 24/04; H04W 24/08; H04W 16/28; H04B 7/0413; H04B 7/082; H04L 43/50; H04L 25/0224
(Continued)

(56) References Cited

U.S. PATENT DOCUMENTS 11,624,765 B2 *   4/2023   Maruo ..................... H01Q 3/16
                                                                  455/423
2010/0222012 A1     9/2010   Shibuya et al.
(Continued)

FOREIGN PATENT DOCUMENTS

CN      102707266 A      10/2012
CN      103986806 A       8/2014
(Continued)

OTHER PUBLICATIONS

International Searching Authority. International Search Report and Written Opinion for PCT Application No. PCT/CN2021/092636 and English translation, mailed Aug. 11, 2021, pp. 1-9.
(Continued)

*Primary Examiner* — Khai Tran
(74) *Attorney, Agent, or Firm* — Vivacqua Crane, PLLC

(57) ABSTRACT

Disclosed are a radio communication apparatus, an antenna testing method and a user equipment (UE). The radio communication apparatus may include a radio frequency (RF) circuit, a testing circuit and an analysis circuit. The RF circuit includes a plurality of antennas configured to receive or transmit RF signals. The testing circuit is connected to the plurality of antennas and configured to sequentially test the plurality of antennas and send testing signals of the plurality of antennas to an analysis circuit. The analysis circuit is connected to the testing circuit and configured to determine
(Continued)

an antenna from the plurality of antennas for transmitting the RF signals according to the testing signals of the plurality of antennas.

11 Claims, 5 Drawing Sheets

(51) Int. Cl.
 *H04B 7/06* (2006.01)
 *H04B 17/00* (2015.01)
(58) Field of Classification Search
 USPC .................................... 375/262, 260, 267
 See application file for complete search history.

(56) References Cited

U.S. PATENT DOCUMENTS

| | | | |
|---|---|---|---|
| 2013/0257454 A1* | 10/2013 | Mow | H01Q 5/328 |
| | | | 324/619 |
| 2014/0050114 A1 | 2/2014 | Gao et al. | |
| 2015/0177277 A1* | 6/2015 | Nickel | G01R 31/2822 |
| | | | 324/629 |
| 2016/0183218 A1* | 6/2016 | Ioffe | H04W 72/02 |
| | | | 455/77 |
| 2016/0191085 A1 | 6/2016 | Kasnavi et al. | |
| 2019/0004102 A1* | 1/2019 | Gienger | H01Q 3/247 |
| 2019/0182779 A1 | 6/2019 | Niu | |
| 2021/0067257 A1* | 3/2021 | Lin | H04B 17/16 |
| 2022/0078643 A1* | 3/2022 | Vierimaa | H04B 17/15 |
| 2022/0099722 A1* | 3/2022 | Wang | H04B 17/104 |
| 2023/0117207 A1* | 4/2023 | Hu | G01R 31/3025 |
| | | | 324/762.05 |

FOREIGN PATENT DOCUMENTS

| | | |
|---|---|---|
| CN | 109039397 A | 12/2018 |
| EP | 1343256 A1 | 9/2003 |
| WO | 2013131230 A1 | 9/2013 |

OTHER PUBLICATIONS

European Patent Office. Extended European Search Report for EP Application No. 21818089.1, mailed Jul. 13, 2023, pp. 1-7.

* cited by examiner

WIRELESS COMMUNICATION APPARATUS, ANTENNA DETECTION METHOD AND USER DEVICE

CROSS REFERENCE TO RELATED APPLICATIONS

This application is a national stage filing under 35 U.S.C. § 371 of international application number PCT/CN2021/092636, filed May 10, 2021, which claims priority to Chinese patent application No. 202010494637.6, filed Jun. 3, 2020. The contents of these applications are incorporated herein by reference in their entirety.

TECHNICAL FIELD

The present disclosure relates to the technical field of communication, in particular to a radio communication apparatus, an antenna testing method and a user equipment (UE).

BACKGROUND

Radio communication apparatuses are widely used in various fields, and a typical radio communication system can adopt multiple access technologies which can support communication with multiple users by sharing available system resources (e.g., bandwidth and transmission power). The multiple access technologies have been adopted in various telecommunication standards to provide a common protocol which enables different wireless devices to communicate at the urban, national, regional or even global level. Examples of multiple access technologies include a long-term evolution (LTE) system, a code division multiple access (CDMA) system, a time division multiple access (TDMA) system, a frequency division multiple access (FDMA) system, an orthogonal frequency division multiple access (OFDMA) system, a single-carrier frequency division multiple access (SC-FDMA) system and a time division synchronous code division multiple access (TD-SCDMA) system. An example of emerging telecommunication standards is new radio (NR), for example, $5^{th}$ Generation (5G) wireless access.

In the existing technology, UE performs radio communication through an antenna. Generally, the number of channels through which UE can simultaneously receive radio frequency (RF) signals is greater than the number of channels through which UE can simultaneously transmit RF signals, so it is necessary to select an antenna for transmitting RF signals, or when a current antenna for transmitting RF signals is in a poor transmission state, the current antenna needs to be replaced with another antenna as the antenna for transmitting RF signals.

SUMMARY

An embodiment of the present disclosure provides a radio communication apparatus, including: an RF circuit comprising a plurality of antennas configured to receive or transmit RF signals; a testing circuit connected to the plurality of antennas and configured to sequentially test the plurality of antennas and send testing signals of the plurality of antennas to an analysis circuit; and the analysis circuit connected to the testing circuit and configured to determine, according to the testing signals of the plurality of antennas, an antenna for transmitting the RF signals, from the plurality of antennas.

An embodiment of the present disclosure further provides an antenna testing method, including: by a testing circuit, sequentially testing a plurality of antennas in an RF circuit to obtain testing signals of the plurality of antennas and sending the testing signals of the plurality of antennas to an analysis circuit; and by the analysis circuit, determining an antenna for transmitting the RF signals, from the plurality of antennas, according to the testing signals of the plurality of antennas.

An embodiment of the present disclosure further provides a UE, including the radio communication apparatus according to the present disclosure.

DETAILED DESCRIPTION

In order to make the purpose, technical schemes and advantages of the present disclosure clearer, the present disclosure will be described in further detail below with reference to the accompanying drawings, and it is obvious that the described embodiments are only some of the embodiments of the present disclosure, and not all of them. All other embodiments obtained by those of ordinary skill in the art based on the embodiments of the present disclosure without inventive effort are within the scope of the present disclosure.

The shape and size of the parts in the accompanying drawings do not reflect the true scale and are intended only to facilitate understanding of the contents of the embodiments of the present disclosure.

Unless otherwise defined, technical terms or scientific terms used in the present disclosure shall have the typical meaning understood by those of ordinary skill in the art to which the present disclosure pertains. The terms "first", "second", etc. used in the present disclosure do not denote any order, quantity, or importance, but are only used to distinguish different components. Likewise, the terms "one", "a/an", "the", etc. are not intended to limit the quantity, but mean at least one. Terms like "comprise" or "include" mean that the elements or articles appearing before the words cover the elements or articles listed after the words and their equivalents, and do not exclude other elements or articles. Terms like "connect" are not limited to physical or mechanical connection, but may include electrical connection, whether direct or indirect. Spatial terms such as "up", "down", "left" and "right" are only used to indicate the relative positional relationship. When the absolute position of a described object changes, the relative positional relationship may also change accordingly.

In the following description, terms used to represent elements such as "module", "component" and "unit" are only to facilitate the description of the present disclosure, and have no special meanings in themselves. Therefore, "module", "component" and "unit" can be used interchangeably.

Figure 1:
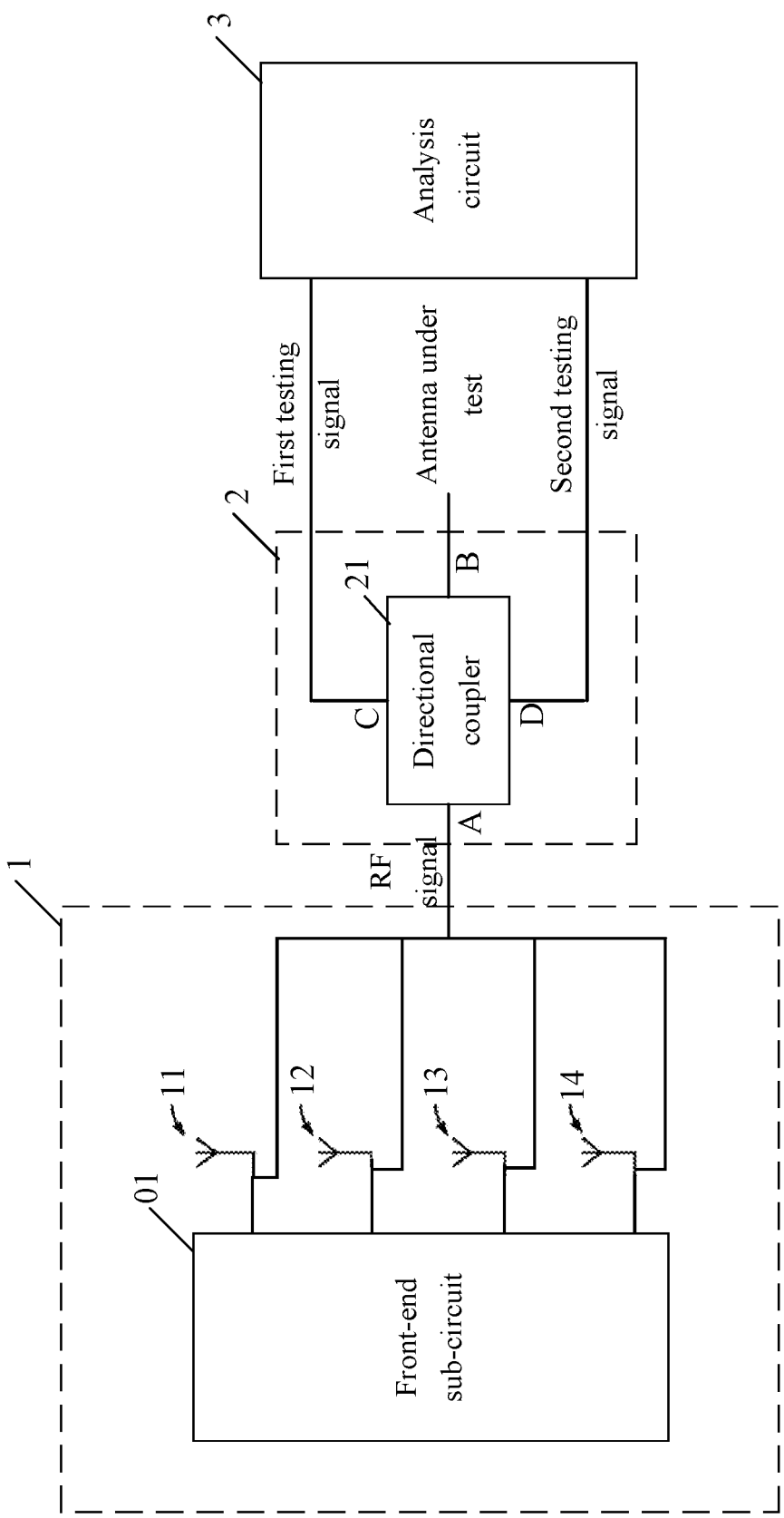
FIG. 1 is a schematic diagram of a radio communication apparatus according to an embodiment of the present disclosure.

FIG. 1 is a schematic diagram of a radio communication apparatus according to an embodiment of the present disclosure.

As shown in FIG. 1, a radio communication apparatus according to an embodiment of the present disclosure may include an RF circuit 1, a testing circuit 2, and an analysis circuit 3.

The RF circuit 1 may include a plurality of antennas (for example, a first antenna 11 to a fourth antenna 14 in FIG. 1). The antenna is used for receiving or transmitting RF signals. The testing circuit 2 is connected to the plurality of antennas in the RF circuit 1. The testing circuit 2 is used for sequentially testing the plurality of antennas to obtain testing signals of the antennas, and send the testing signals of the antennas to the analysis circuit 3. The analysis circuit 3 is connected to the testing circuit 2. The analysis circuit 3 is used for determining which of the plurality of antennas will be used for transmitting RF signals (hereinafter referred to as transmitting antenna) according to the testing signals of the antennas transmitted by the testing circuit 2.

A UE is provided with a radio communication apparatus. Generally, the ability of the radio communication apparatus to receive RF signals is different from that of transmitting RF signals, that is, the number of channels through which the radio communication apparatus can simultaneously receive RF signals is greater than the number of channels through which the radio communication apparatus can simultaneously transmit RF signals. Generally, the number of channels for receiving RF signals is the same as that of antennas in the RF circuit 1, and the number of channels for transmitting RF signals is smaller than that of antennas in the RF circuit 1. Therefore, before transmitting RF signals, the testing circuit 2 can sequentially test the plurality of antennas to determine the best antenna(s) for transmitting RF signals, then the channels for transmitting RF signals are connected to the antenna(s) for transmitting RF signals in different transmission time slots, and RF signals are transmitted through the antenna(s), thus optimizing the communication quality of radio communication. In response to determining that the transmitting antennas are in a state of transmitting RF signals (i.e., uplink), the testing circuit 2 can continuously monitor the transmitting antennas and transmit the testing signals of the transmitting antennas to the analysis circuit 3. In response to deterioration of the working state of the transmitting antenna, for example, the antenna is blocked, the testing signal obtained by the testing circuit 2 changes, so that the analysis circuit 3 can switch to a new antenna as the antenna for transmitting RF signals, thereby further ensuring the communication quality of radio communication.

It should be noted that the RF circuit 1 may include any number of antennas, and the specific number can be determined as needed. The following description is based on the assumption that the RF circuit 1 includes four antennas (that is, the first antenna 11 to the fourth antenna 14).

As shown in FIG. 1, the RF circuit 1 includes the plurality of antennas 11 to 14 and a front-end sub-circuit 01. The front-end sub-circuit 01 is connected to the plurality of antennas 11 to 14 to receive RF signals and sequentially transmit the RF signals to the antennas. The testing circuit 2 is connected between the front-end sub-circuit 01 and each antenna. The front-end sub-circuit 01 activates one antenna and sends the RF signal to the antenna, and the RF signal will first flow into the testing circuit 2. The testing circuit 2 obtains a testing signal corresponding to the antenna according to the RF signal, and sends the testing signal to the analysis circuit 3. The front-end sub-circuit 01 sequentially activates each antenna to transmit RF signals, and the testing circuit 2 can sequentially receive RF signals corresponding to each antenna, obtain testing signals corresponding to each antenna according to the RF signals, and send each testing signal to the analysis circuit 3. According to the testing signals, the analysis circuit 3 compares the antennas and determines the antenna(s) used for transmitting RF signals.

Optionally, as shown in FIG. 1, the testing circuit 2 may include a directional coupler 21. The directional coupler 21 may include four ports, namely, a first port A, a second port B, a third port C and a fourth port D. The first port A may be an input port of the directional coupler 21, the second port B may be an output port of the directional coupler 21, the third port C may be a coupling port of the directional coupler 21, and the fourth port D may be an isolation port of the directional coupler 21. Hereinafter, the first port A to the fourth port D are referred to as input port A, output port B, coupling port C and isolation port D respectively. The input port A of the directional coupler 21 is connected to the front-end sub-circuit 01, and receives the RF signals transmitted by the front-end sub-circuit 01. The output port B of the directional coupler 21 is connected to the plurality of antennas, that is, the output port B of the directional coupler 21 connects the plurality of antennas in series. When the front-end sub-circuit 01 activates one antenna (the antenna activated by the front-end sub-circuit 01 can be called an antenna under test), the output port B of the directional coupler 21 can be regarded as correspondingly connected to the antenna under test. The coupling port C of the directional coupler 21 is connected to the analysis circuit 3. The isolation port D of the directional coupler 21 is also connected to the analysis circuit 3. When the front-end sub-circuit 01 sequentially activates each antenna, the directional coupler 21 receives the RF signals corresponding to each antenna through the input port A, and allocates the RF signals into a first testing signal and a second testing signal through coupling, which are testing signals corresponding to the antenna under test. The coupling port C outputs the first testing signal and transmits the first testing signal to the analysis circuit 3. The isolation port D outputs the second testing signal and transmits the second testing signal to the analysis circuit 3. According to the principle of the directional coupler 21, the first testing signal is incident wave U+ (main signal of the directional coupler 21), and the second testing signal is reflected wave U- (branch signal of the directional coupler 21). Therefore, the analysis circuit 3 can determine a reflection coefficient $\Gamma$ ($\Gamma$=U-/U+) of the antenna under test according to a ratio coefficient of the incident wave U+ and the reflected wave U- transmitted by the directional coupler 21. After calculating the reflection coefficient $\Gamma$ of each antenna, the analysis circuit 3 can further calculate parameters such as impedance matching and insertion loss corresponding to each antenna according to the reflection coefficient $\Gamma$, so as to compare the antennas according to the calculated parameters to determine the best antenna(s) for transmitting RF signals.

Figure 2:
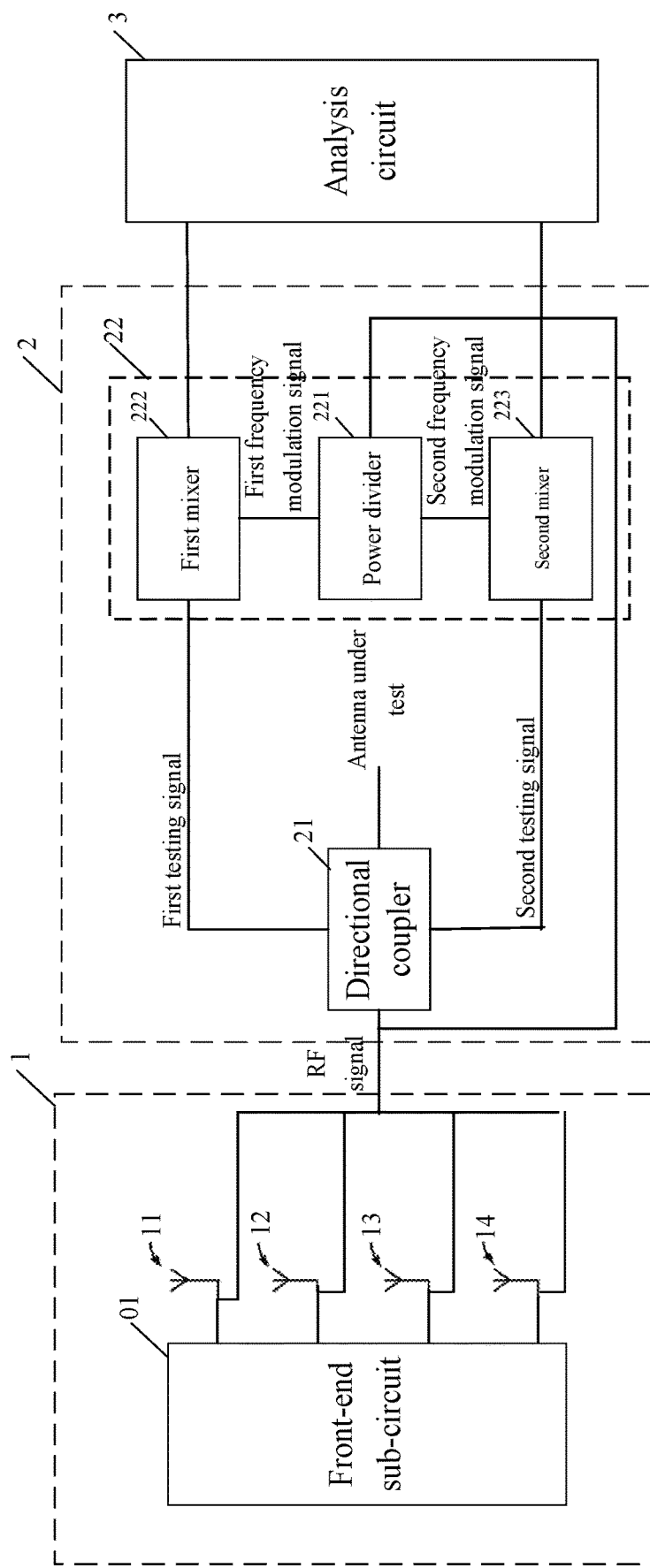
FIG. 2 is another schematic diagram of a radio communication apparatus according to an embodiment of the present disclosure.

FIG. 2 is another schematic diagram of a radio communication apparatus according to an embodiment of the present disclosure.

As shown in FIG. 2, a radio communication apparatus according to an embodiment of the present disclosure may include an RF circuit 1, a testing circuit 2, and an analysis circuit 3. Unlike the embodiment shown in FIG. 1, the testing circuit 2 may include a directional coupler 21 and a frequency modulation sub-circuit 22. The frequency modulation sub-circuit 22 is used for modulating the frequency of the testing signal output by the directional coupler 21.

The input port A of the directional coupler 21 is connected to the front-end sub-circuit 01, and receives the RF signals transmitted by the front-end sub-circuit 01. The output port B of the directional coupler 21 is connected to the plurality of antennas, that is, the output port B of the directional coupler 21 connects the plurality of antennas in series. When the front-end sub-circuit 01 activates the antenna under test, the output port B of the directional coupler 21 can be regarded as correspondingly connected to the antenna under test. The coupling port C of the directional coupler 21 is connected to the analysis circuit 3. The isolation port D of the directional coupler 21 is also connected to the analysis circuit 3. When the front-end sub-circuit 01 sequentially activates each antenna, the directional coupler 21 receives the RF signals corresponding to each antenna through the input port A, and divides the RF signal into a first testing signal and a second testing signal through coupling, which are testing signals corresponding to the antenna under test. The coupling port C outputs the first testing signal, and the isolation port D outputs the second testing signal. The frequency modulation sub-circuit 22 is connected between the directional coupler 21 and the analysis circuit 3, and is used for modulating the frequencies of the testing signals (i.e., the first testing signal and the second testing signal). In some embodiments, the frequency of the RF signal input from the front-end sub-circuit 01 to the directional coupler 21 is high, so the frequencies of the first testing signal and the second testing signal coupled from the directional coupler 21 are also high. The frequencies of the first testing signal and the second testing signal may exceed a frequency range that the analysis circuit 3 can handle, so the frequency range of signals can be preset according to the processing capacity of the analysis circuit 3. The frequency modulation sub-circuit 22 is arranged between the directional coupler 21 and the analysis circuit 3, and the first testing signal and the second testing signal output by the directional coupler 21 can be frequency modulated by the frequency modulation sub-circuit 22 and then input into the analysis circuit 3, so as to ensure that the frequencies of the frequency modulated first testing signal and second testing signal are within the preset frequency range. According to the principle of the directional coupler 21, the first testing signal is incident wave U+ (main signal of the directional coupler 21), and the second testing signal is reflected wave U− (branch signal of the directional coupler 21). The incident wave U+ and the reflected wave U− are input to the analysis circuit 3 after being frequency modulated by the frequency modulation sub-circuit 22. The analysis circuit 3 can determine a reflection coefficient $\Gamma$ ($\Gamma = U-/U+$) of the antenna under test according to a ratio coefficient of the frequency modulated incident wave U+ and reflected wave U−. After calculating the reflection coefficient $\Gamma$ of each antenna, the analysis circuit 3 can further calculate parameters such as impedance matching and insertion loss corresponding to each antenna according to the reflection coefficient $\Gamma$, so as to compare the antennas according to the calculated parameters to determine the best antenna(s) for transmitting RF signals.

Optionally, as shown in FIG. 2, the frequency modulation sub-circuit 22 may include a power divider 221, a first mixer 222 and a second mixer 223.

The power divider 221 may include three ports. A first port of the power divider 221 is connected to the first mixer 222, a second port of the power divider 221 is connected to the second mixer 223, and a third port of the power divider 221 is connected to the front-end sub-circuit 01. The power divider 221 can receive the RF signal transmitted by the front-end sub-circuit 01 through the third port. It should be noted that the RF signal received by the power divider 221 and the RF signal received by the directional coupler 21 are the same RF signal. The power divider 221 divides the RF signal into a first frequency modulation signal and a second frequency modulation signal, outputs the first frequency modulation signal through the first port to transmit the first frequency modulation signal to the first mixer 222, and outputs the second frequency modulation signal through the second port to transmit the second frequency modulation signal to the second mixer 223.

The first mixer 222 may include three ports. A first port of the first mixer 222 is connected to the coupling port C of the directional coupler 21 to receive the first testing signal output by the coupling port C of the directional coupler 21; a second port of the first mixer 222 is connected to the first port of the power divider 221 to receive the first frequency modulation signal output by the first port of the power divider 221; and a third port of the first mixer 222 is connected to the analysis circuit 3. The first mixer 222 processes the first testing signal with the first frequency modulation signal for frequency mixing (i.e., performs frequency down-conversion on the first testing signal) and then inputs the processed signal to the analysis circuit 3 through the third port to ensure that the frequency of the first testing signal is within a preset frequency range.

The second mixer 223 may include three ports. A first port of the second mixer 223 is connected to the isolation port D of the directional coupler 21 to receive the second testing signal output by the isolation port D of the directional coupler 21; a second port of the second mixer 223 is connected to the second port of the power divider 221 to receive the second frequency modulation signal output by the second port of the power divider 221; and a third port of the second mixer 223 is connected to the analysis circuit 3. The second mixer 223 processes the second testing signal with the second frequency modulation signal for frequency mixing (i.e., performs frequency down-conversion on the second testing signal) and then inputs the processed signal to the analysis circuit 3 through the third port to ensure that the frequency of the second testing signal is within a preset frequency range.

Optionally, the power divider 221 in the frequency modulation sub-circuit 22 may be a one-to-two power divider, that is, the power divider 221 can equally divide the received RF signal into two paths (i.e., the first frequency modulation signal and the second frequency modulation signal). In other words, the power of the first frequency modulation signal and the power of the second frequency modulation signal are equal.

Figure 3:
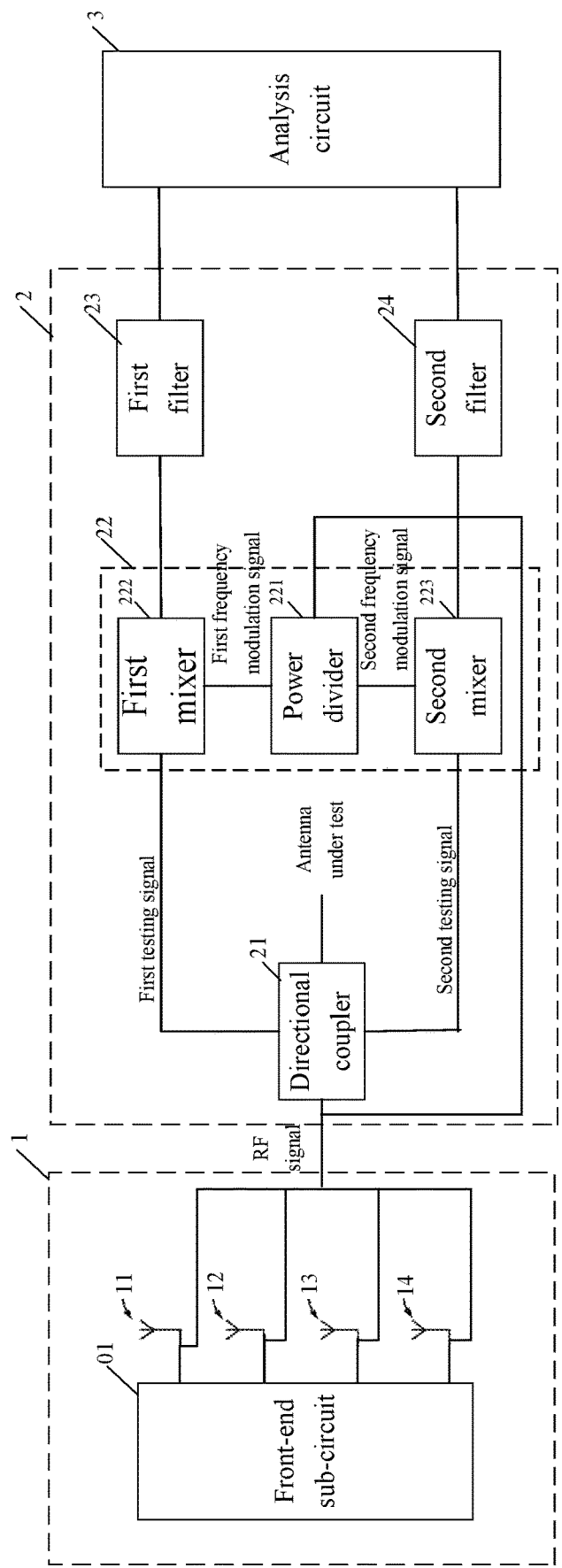
FIG. 3 is another schematic diagram of a radio communication apparatus according to an embodiment of the present disclosure.

FIG. 3 is another schematic diagram of a radio communication apparatus according to an embodiment of the present disclosure.

Optionally, as shown in FIG. 3, in some embodiments, the testing circuit 2 may further include a first filter 23 and a second filter 24. The first filter 23 may be connected between the coupling port C of the directional coupler 21 and the analysis circuit 3, and filter the first testing signal output by the coupling port C of the directional coupler 21 to ensure the stability of the first testing signal received by the analysis circuit 3. The second filter 24 may be connected between the isolation port D of the directional coupler 21 and the analysis circuit 3, and filter the second testing signal output by the isolation port D of the directional coupler 21 to ensure the stability of the second testing signal received by the analysis circuit 3.

Referring to FIG. 3, the testing circuit 2 may include a directional coupler 21 and a frequency modulation sub-circuit 22, and the frequency modulation sub-circuit 22 may include a power divider 221, a first mixer 222 and a second mixer 223. The first filter 23 may be connected between the first mixer 222 and the analysis circuit 3, and filters the frequency modulated first testing signal. The second filter 24 may be connected between the second mixer 223 and the analysis circuit 3, and filters the frequency modulated second testing signal.

Optionally, the first filter 23 and the second filter 24 may be low-pass filters, and since the frequencies of the frequency modulated first testing signal and second testing signal are low, filtration with a low-pass filter is feasible.

It should be noted that in the radio communication apparatus according to the embodiments of the present disclosure, for example, in the embodiments described in FIGS. 1-3, the directional coupler 21 may be replaced with a power divider. In response to the RF circuit 1 only including one antenna, the antenna may be connected to the power divider. In response to the RF circuit 1 including multiple antennas, the multiple antennas can be connected in series to a matching end of the power divider. The power divider can divide the RF signal into incident wave U+ and reflected wave U−, and input the incident wave U+ and the reflected wave U− to the analysis circuit 3, so that the analysis circuit 3 can calculate the reflection coefficient of the antenna under test.

Optionally, in the embodiment of the present disclosure, the RF circuit 1 may be an RF circuit for sounding reference signals (SRS). SRS is a reference signal transmitted by UE in an uplink direction. A base station (e.g., gNB or eNB) may use SRS to estimate uplink channel quality, and the base station may use this information to schedule uplink frequency resources for the UE. The UE may transmit SRS via different antennas using one or more transmission chains of the UE. In this embodiment, the RF circuit 1 for transmitting or receiving RF signals may be used as the RF circuit for transmitting SRS, that is, radio communication is performed through the SRS RF circuit.

Optionally, the front-end sub-circuit 01 includes at least one transmitter (PA) and a plurality of switch sub-circuits. The plurality of switch sub-circuits are connected to the antennas, respectively, and the PA sequentially connects each of the antennas through respective switch sub-circuits to send RF signals to the respective antennas.

Figure 4:
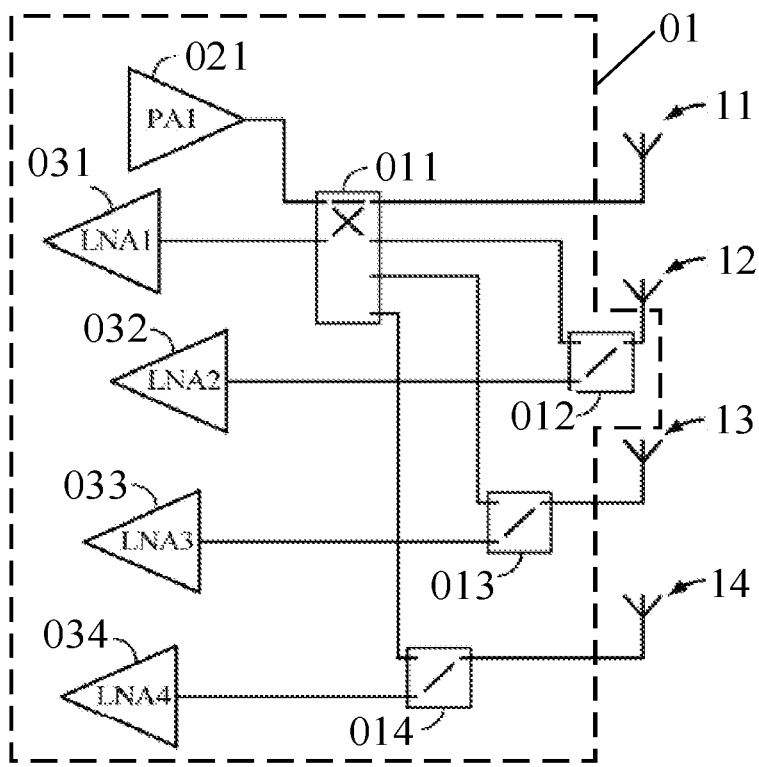
FIG. 4 is a schematic diagram of an RF circuit in a radio communication apparatus according to an embodiment of the present disclosure.
Figure 5:
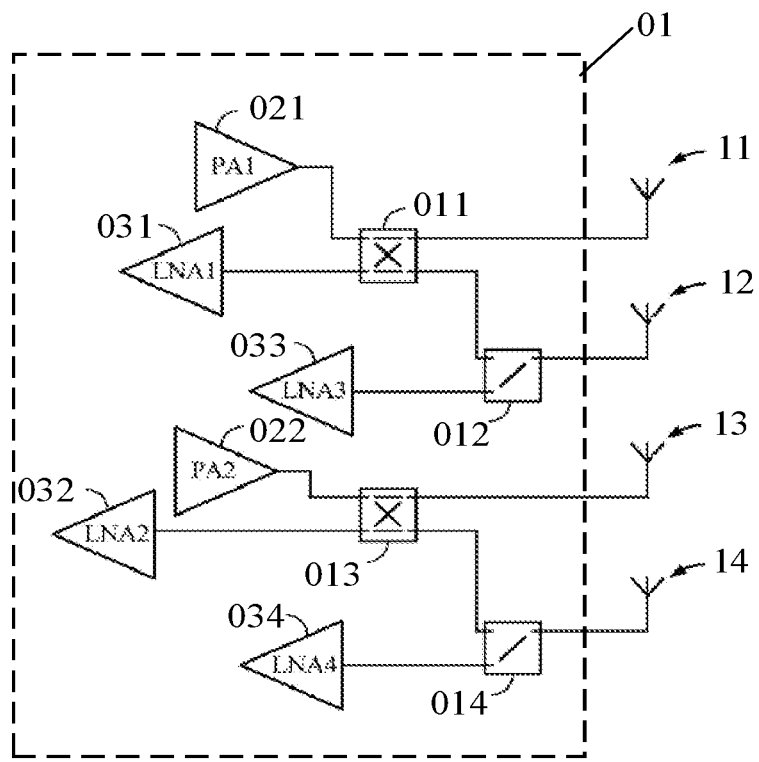
FIG. 5 is another schematic diagram of an RF circuit in a radio communication apparatus according to an embodiment of the present disclosure.
Figure 6:
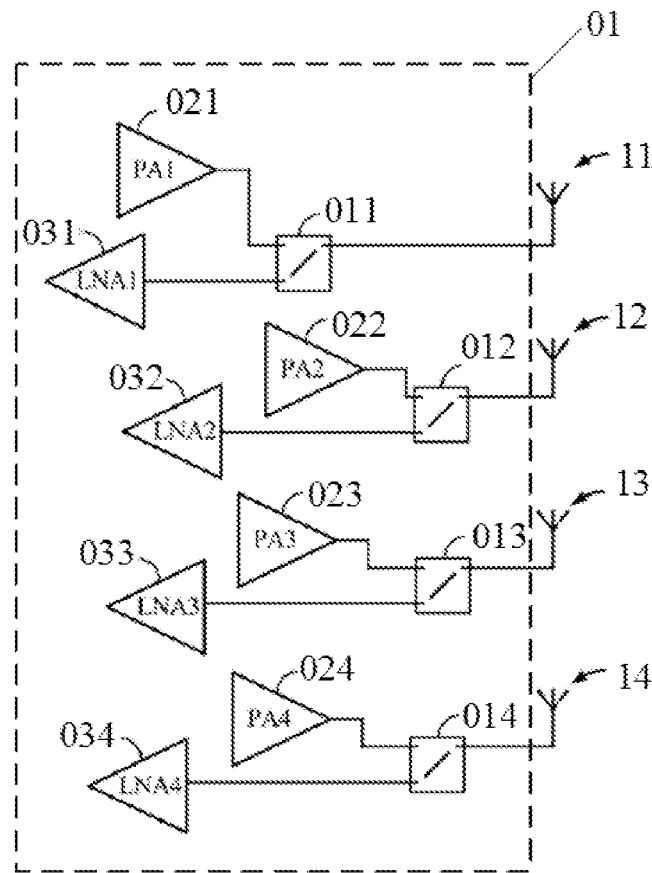
FIG. 6 is another schematic diagram of an RF circuit in a radio communication apparatus according to an embodiment of the present disclosure.

Specifically, referring to FIGS. 4-6, it is assumed that the RF circuit 1 includes four antennas 11 to 14, and FIGS. 4-6 respectively show RF circuits 1 with one PA, two PAs and four PAs.

As shown in FIG. 4, the front-end sub-circuit 01 includes a PA 021, and a first switch sub-circuit 011 is configured to allow the RF signal transmitted by the PA 021 to be coupled to one of the first antenna 11 to the fourth antenna 14. The second antenna 12 is connected to a second switch sub-circuit 012, the third antenna 13 is connected to a third switch sub-circuit 013, and the fourth antenna 14 is connected to a fourth switch sub-circuit 014. The first switch sub-circuit 011 is a main switch. In addition, the first switch sub-circuit 011 corresponding to the first antenna 11 is connected to a first low noise amplifier (LNA) 031, the second switch sub-circuit 012 corresponding to the second switch 12 is connected to a second LNA 032, the third switch sub-circuit 013 corresponding to the third switch 13 is connected to a third LNA 033, and the fourth switch sub-circuit 014 corresponding to the fourth switch 14 is connected to a fourth LNA 034. In the receiving process, each antenna couples the received signal to the corresponding LNA. The first antenna 11 may be designated for both uplink and downlink (hereinafter referred to as a transmitting (Tx) antenna), and may be adjacent to the PA 021 for amplifying transmission signals. The second antenna 12, the third antenna 13, and the fourth antenna 14 may be receiving (Rx) antennas designated for downlink communication, and may not be adjacent to any PA (for example, PA 021). As shown in the figure, the PA 021 may be connected to any one of the second switch sub-circuit 012 corresponding to the second antenna 12, the third switch sub-circuit 013 corresponding to the third antenna 13 and the fourth switch sub-circuit 014 corresponding to the fourth antenna 14, so as to use the second antenna 12, the third antenna 13 and the fourth antenna 14 for transmitting RF signals (for example, SRS). When the PA 021 is to transmit RF signals to the antennas, the testing circuit 2 can sequentially test the first antenna 11 to the fourth antenna 14, and input the testing signals corresponding to the four antennas to the analysis circuit 3. The analysis circuit 3 determines the reflection coefficients of the first antenna 11 to the fourth antenna 14 according to their respective testing signals, and compares the four antennas according to the reflection coefficients to determine the best antenna(s) for transmitting RF signals. Then, a signal for selecting the transmitting antennas is transmitted to the switches (not shown in the figure) for selectively connecting the antennas. The switches for selectively connecting the antennas can connect the corresponding antenna(s) according to the signal transmitted from the analysis circuit 3, so as to couple the output of the PA 021 to the selected antenna(s), making the selected antenna(s) serve as the antenna(s) for transmitting RF signals. As shown in FIG. 4, the RF circuit 1 in this embodiment allows RF signals to be transmitted by one of the four antennas 11 to 14 at any time point.

Optionally, referring to FIG. 5, in this embodiment, the front-end sub-circuit 01 in the RF circuit 1 includes two PAs, namely, a first PA 021 and a second PA 022. In this case, the first antenna 11 and the third antenna 13 may be Tx antennas for transmitting RF signals, and the second antenna 12 and the fourth antenna 14 may be Rx antennas for receiving RF signals. The first PA 021 may be used for SRS transmission using the first antenna 11 or the second antenna 12 and the second PA 022 may be used for SRS transmission using the third antenna 13 or the fourth antenna 14. For example, the first PA 021 may be coupled to the first switch sub-circuit 011 to allow the output of the first PA 021 to be coupled to one of the first antenna 11 and the second antenna 12 through the first switch sub-circuit 011. The first switch sub-circuit 011 and the second switch sub-circuit 012 may be configured to connect the first antenna 11 and the second antenna 12 to the first LNA 031 and the third LNA 033 respectively during reception. As shown in FIG. 5, the RF circuit 1 in this embodiment allows RF signals to be transmitted by two of the four antennas 11 to 14 at any time point.

Optionally, referring to FIG. 6, the front-end sub-circuit 011 in the RF circuit 1 includes a first PA 021, a second PA 022, a third PA 023 and a fourth PA 024, which are coupled to the first antenna 11, the second antenna 12, the third antenna 13 and the fourth antenna 14 through the first switch sub-circuit 011, the second switch sub-circuit 012, the third switch sub-circuit 013 and the fourth switch sub-circuit 014 respectively. As shown in FIG. 6, the first switch sub-circuit 011, the second switch sub-circuit 012, the third switch sub-circuit 013, and the fourth switch sub-circuit 014 may be configured to connect the first antenna 11, the second antenna 12, the third antenna 13, and the fourth antenna 14 to the first LNA 031, the second LNA 032, the third LNA 033, and the fourth LNA 034 respectively during reception. As shown in FIG. 6, the RF circuit 1 in this embodiment allows RF signals to be transmitted by the four antennas 11 to 14 at any time point.

It should be noted that more antennas may be included in the RF circuit 1, and correspondingly, more PAs and switch sub-circuits may be included in the front-end sub-circuit 011. The above are only examples and do not limit the present disclosure.

Figure 7:
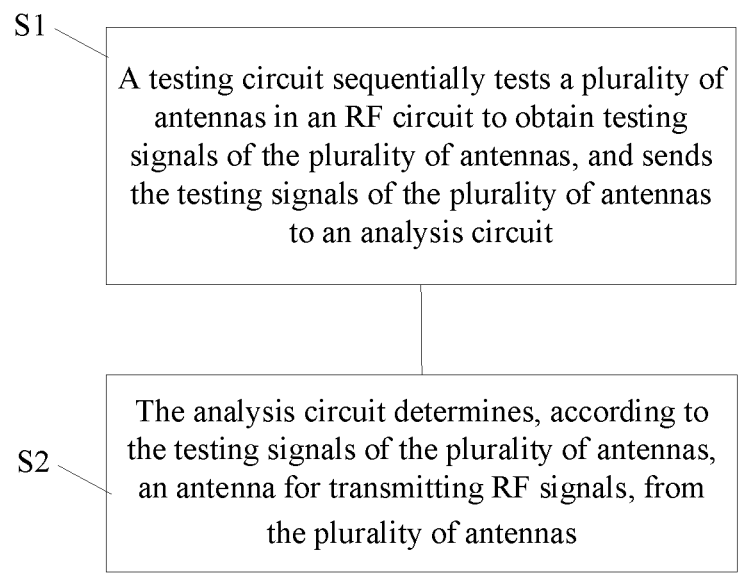
FIG. 7 is a flowchart of an antenna testing method according to an embodiment of the present disclosure.

Accordingly, as shown in FIG. 7, an embodiment of the present disclosure further provides an antenna testing method including steps S1 to S2.

At S1, a testing circuit sequentially tests a plurality of antennas in a RF circuit to obtain testing signals of the plurality of antennas and sends the testing signals of the plurality of antennas to an analysis circuit.

Specifically, the RF circuit may include a front-end sub-circuit and a plurality of antennas. The testing circuit may be connected between the front-end sub-circuit and each antenna. The testing circuit receives the RF signal to be transmitted to the corresponding antenna by the front-end sub-circuit, couples the RF signal into a first testing signal (for example, incident wave U+) and a second testing signal (for example, reflected wave U−), and transmits the first testing signal and the second testing signal to the analysis circuit.

Optionally, assuming that the RF circuit is an SRS RF circuit, the testing circuit can sequentially test each antenna when the RF circuit transmits SRS (i.e., when SRS is used as a reference signal for communication). The testing circuit can also test the antennas in a polling manner, that is, the testing circuit can sequentially test each antenna at preset time intervals.

At S2, the analysis circuit determines, according to the testing signals of the plurality of antennas, which of the plurality of antennas will be used for RF signal transmitting.

Specifically, after receiving the first testing signal (e.g., incident wave U+) and the second testing signal (e.g., reflected wave U−) of each antenna transmitted by the testing circuit, the analysis circuit can determine a reflection coefficient Γ (Γ=U−/U+) of each antenna according to the incident wave U+ and the reflected wave U−, and then calculate the impedance matching and insertion loss of each antenna according to the reflection coefficient Γ, so as to compare the antennas according to the impedance matching and insertion loss to determine which of the plurality of antennas will be used for RF signal transmitting.

Accordingly, an embodiment of the present disclosure further provides a UE including the radio communication apparatus according to the embodiments of the present disclosure. The radio communication apparatus in the UE can determine which of a plurality of antennas should be used for transmitting RF signals via a testing circuit in the radio communication apparatus, thus ensuring the communication quality of radio communication.

It can be understood that the above embodiments are only exemplary embodiments used to illustrate the principles of the present disclosure, and the present disclosure is not limited thereto. For those having ordinary skill in the art, various modifications and improvements can be made without departing from the principle and essence of the present disclosure, and these modifications and improvements are also regarded as being within the scope of protection of the present disclosure.

The invention claimed is:

1. A radio communication apparatus, comprising:
a radio frequency (RF) circuit, comprising a plurality of antennas configured to receive or transmit RF signals, and a front-end sub-circuit connected to the plurality of antennas, and configured to receive the RF signals and sequentially transmit the RF signals to the plurality of antennas, sequentially;
a testing circuit, comprising a directional coupler, the testing circuit connected between the front-end sub-circuit and the plurality of antennas, and configured to receive the RF signals transmitted by the front-end sub-circuit to the respective antennas, and obtain the testing signals of the respective antennas according to the RF signals to sequentially test the plurality of antennas and send the testing signals of the plurality of antennas to an analysis circuit, wherein the directional coupler comprises a first port connected to the front-end sub-circuit to receive the RF signals, a second port connected to the plurality of antennas, and a third port and a fourth port connected to the analysis circuit, and wherein the testing signals comprise a first testing signal which is incident wave output from the third port of the directional coupler and a second testing signal which is reflected wave output from the fourth port of the directional coupler; and
the analysis circuit, connected to the testing circuit, and configured to determine reflection coefficients of the respective antennas according to the first testing signal and the second testing signal and determine an antenna for transmitting the RF signals, from the plurality of antennas, according to the reflection coefficients from the testing signals of the plurality of antennas.

2. The radio communication apparatus of claim 1, wherein, the testing circuit comprises a frequency modulation sub-circuit, which
is connected between the directional coupler and the analysis circuit, and configured to modulate frequencies of the first testing signal and the second testing signal to ensure that the frequencies of the first testing signal and the second testing signal are within a preset frequency range.

3. The radio communication apparatus of claim 2, wherein, the frequency modulation sub-circuit comprises a power divider, a first mixer, and a second mixer,
the power divider is connected to the first mixer and the second mixer, and configured to receive the RF signals, divide the RF signals into a first frequency modulation signal and a second frequency modulation signal, and transmit the first frequency modulation signal to the first mixer and the second frequency modulation signal to the second mixer;
the first mixer is connected to the third port of the directional coupler, and configured to receive the first testing signal, process the first testing signal with the first frequency modulation signal for frequency mixing, and input the processed first testing signal into the analysis circuit; and the second mixer is connected to the fourth port of the directional coupler, and configured to receive the second testing signal, process the second testing signal with the second frequency modulation signal for frequency mixing, and input the processed second testing signal into the analysis circuit.

4. The radio communication apparatus of claim 3, wherein, the power divider is a one-to-two power divider.

5. The radio communication apparatus of claim 1, wherein, the testing circuit further comprises a first filter and a second filter,
the first filter is connected between the third port of the directional coupler and the analysis circuit, and
the second filter is connected between the fourth port of the directional coupler and the analysis circuit.

6. The radio communication apparatus of claim 1, wherein, the front-end sub-circuit comprises at least one transmitter, and
a plurality of switch sub-circuits connected to the plurality of antennas, respectively, and
the transmitter is configured to sequentially connects the antennas through the plurality of switch sub-circuits to transmit the RF signals to the respective antennas.

7. The radio communication apparatus of claim 1, wherein, the RF circuit is for sounding reference signals (SRSs).

8. The radio communication apparatus of claim 2, wherein, the testing circuit further comprises a first filter and a second filter,
the first filter is connected between the third port of the directional coupler and the analysis circuit, and
the second filter is connected between the fourth port of the directional coupler and the analysis circuit.

9. An antenna testing method, comprising:
a testing circuit, testing a plurality of antennas in a radio frequency (RF) circuit sequentially, to obtain testing signals of the plurality of antennas, and sending the testing signals of the plurality of antennas to an analysis circuit, wherein, the testing signals comprise a first testing signal which is incident wave output from a directional coupler of the testing circuit and a second testing signal which is reflected wave output from the directional coupler of the testing circuit; and
the analysis circuit, calculating reflection coefficients corresponding to the antennas according to the first testing signals and the second testing signal, and determining an antenna for transmitting the RF signals, from the plurality of antennas, according to the reflection coefficients from the testing signals of the plurality of antennas.

10. The method of claim 9, wherein, the RF circuit is a RF circuit for sounding reference signals (SRSs); and
the testing circuit sequentially tests the plurality of antennas when the RF circuit transmits the SRSs; or,
the testing circuit sequentially tests the plurality of antennas at preset time intervals.

11. A user equipment (UE), comprising a radio communication apparatus, the UE comprising:
a radio frequency (RF) circuit, comprising a plurality of antennas configured to receive or transmit RF signals, and a front-end sub-circuit connected to the plurality of antennas, and configured to receive the RF signals and sequentially transmit the RF signals to the plurality of antennas, sequentially;
a testing circuit, comprising a directional coupler, the testing circuit connected between the front-end sub-circuit and the plurality of antennas, and configured to receive the RF signals transmitted by the front-end sub-circuit to the respective antennas, and obtain testing signals of the respective antennas according to the RF signals to sequentially test the plurality of antennas and send the testing signals of the plurality of antennas to an analysis circuit, wherein the directional coupler comprises a first port connected to the front-end sub-circuit to receive the RF signals, a second port connected to the plurality of antennas, and a third port and a fourth port connected to the analysis circuit, and wherein the testing signals comprise a first testing signal which is incident wave output from the third port of the directional coupler and a second testing signal which is reflected wave output from the fourth port of the directional coupler; and
the analysis circuit, connected to the testing circuit, and configured to determine reflection coefficients of the respective antennas according to the first testing signal and the second testing signal and determine an antenna for transmitting the RF signals, from the plurality of antennas, according to the reflection coefficients from the testing signals of the plurality of antennas.

* * * * *